(12) United States Patent  (10) Patent No.: US 8,085,422 B2
Morita  (45) Date of Patent: Dec. 27, 2011

(54) PRINTING SYSTEM, PRINTING APPARATUS, AND PRINTING METHOD (75) Inventor: Naoki Morita, Kawasaki (JP)

(73) Assignee: Canon Kabushiki Kaisha (JP)

( * ) Notice: Subject to any disclaimer, the term of this patent is extended or adjusted under 35 U.S.C. 154(b) by 600 days.

(21) Appl. No.: 12/336,676

(22) Filed: Dec. 17, 2008

(65) Prior Publication Data

US 2009/0161156 A1  Jun. 25, 2009

(30) Foreign Application Priority Data

Dec. 19, 2007 (JP) ................. 2007-327365

(51) Int. Cl.
G06F 3/12 (2006.01)
H04N 1/00 (2006.01)
H04B 7/00 (2006.01)
H04W 4/00 (2009.01)
G06F 15/16 (2006.01)
G06F 21/00 (2006.01)

(52) U.S. Cl. ....... 358/1.15; 358/1.6; 358/402; 455/41.3; 455/466; 709/203; 709/217; 713/182

(58) Field of Classification Search .............. 358/1.15, 358/1.6, 402; 455/41.3, 466; 709/203, 217; 713/182
See application file for complete search history.

(56) References Cited

U.S. PATENT DOCUMENTS 7,616,337 B2* 11/2009 Hayashi ................ 358/1.15
2004/0137919 A1* 7/2004 Biundo ................. 455/466
2005/0270569 A1 12/2005 Hayashi

FOREIGN PATENT DOCUMENTS

JP  2005-352584 A  12/2005

* cited by examiner

Primary Examiner — King Poon
Assistant Examiner — Neil R McLean
(74) Attorney, Agent, or Firm — Rossi, Kimms & McDowell LLP

(57) ABSTRACT

A printing system capable of properly selecting a printer driver without putting load on the user, and generating print data using the selected printer driver even when the operating apparatus cannot communicate directly with an information processing apparatus having a print data-generating function. The printing apparatus generates a list of printer drives notified from information processing apparatuses, and sends the list to the operating apparatus when requested. The operating system selects a printer driver from the list and sends information of the selection and image data to the printing apparatus. The printing apparatus sends the image data to an information processing apparatus provided with the selected printer driver. The information processing apparatus generates print data from the image data and sends the print data to the printing apparatus.

6 Claims, 10 Drawing Sheets

FIG.9

| COMPUTER NAME | LOGICAL PRINTER NAME | PASSWORD | CONNECTION TYPE | CPU OPERATING FREQUENCY |
|---|---|---|---|---|
| UserA_PC | Printer_xxx | xxxxxx | USB | 2.40GHz |
| UserB_PC | Printer_xxx (1) | xxxxxxxx | Network | 3.20GHz |
| UserB_PC | Printer_xxx (2) | xxxxxxxx | Common Client | 3.20GHz |
| UserC_PC | Printer_xxx | xxxxxxx | Network | 1.66GHz |
| UserD_PC | Printer_xxx | xxxxxx | Network | 1.20GHz |

FIG.10

PRINTING SYSTEM, PRINTING APPARATUS, AND PRINTING METHOD

BACKGROUND OF THE INVENTION

1. Field of the Invention

The present invention relates to a printing system, a printing apparatus, and a printing method.

2. Description of the Related Art

There have been known an information processing apparatus that generates print data based on input image data, and a printing system that includes a printing apparatus which executes print processing based on the print data generated by the information processing apparatus.

In the above-mentioned printing system, it is assumed that image data stored in an operating apparatus, such as a cellular phone or a digital camera, is caused to be printed by the printing apparatus via the operating apparatus. In this case, the printing apparatus does not have the function (print data-generating function) of generating print data from image data, and therefore it is necessary to generate print data from the image data using the information processing apparatus having the print data-generating function. It should be noted that in print data from the image data using the information processing apparatus having the print data-generating function. It should be noted that in general, the print data-generating function is realized by execution of an application called a printer driver by the information processing apparatus.

Now, some operating apparatuses do not have performance capabilities that can incorporate a print data-generating function. Further, even if an operating apparatus has performance capabilities that can incorporate a print data-generating function, since the print data-generating function is various in type, the operating apparatus is required to have all types of print data-generating functions having a possibility of being used by the same, which requirement is very difficult to meet. This makes it necessary for the operating apparatus to cause an information processing apparatus provided with the print data-generating function to generate print data.

However, if the operating apparatus does not know the access destination (address) of the information processing apparatus provided with the print data-generating function, it cannot cause the information processing apparatus to generate print data.

To eliminate this inconvenience, conventionally, there has been proposed a method in which in response to a print request transmitted from an operating apparatus to a printing apparatus, the printing apparatus transmits the access destination of an information processing apparatus provided with the print data-generating function to the operating apparatus (see e.g. Japanese Patent Laid-Open Publication No. 2005-352584).

This method enables the operating apparatus to know the access destination of the information processing apparatus, and it is possible to generate print data using the information processing apparatus.

However, in the technique disclosed in Japanese Patent Laid-Open Publication No. 2005-352584, image data to be converted into print data is transmitted from the operating apparatus (portable information apparatus) to the information processing apparatus (print service server) without via the printing apparatus.

Therefore, this technique has a problem that if the operating apparatus and the information processing apparatus cannot directly communicate with each other, it is impossible to generate print data using the information processing apparatus even if the operating apparatus knows the access destination of the information processing apparatus.

For example, if the operating apparatus is provided with only a communication unit enabling short distance communication, such as infrared communication, and the operating apparatus and the information processing apparatus having the print data-generating function are distant from each other, the operating apparatus cannot communicate with the information processing apparatus even if the operating apparatus knows the access destination of the information processing apparatus.

Further, when there are a plurality of information processing apparatuses that have the print data-generating function, or when an information processing apparatus includes a plurality of printer drivers, it is necessary to select which information processing apparatus or which printer driver is to be used for generating print data.

When the information processing apparatus or the printer driver is to be selected, however, it is necessary to take various conditions, such as security, a type of connection, and so forth, into account, which can make the selection difficult to perform.

SUMMARY OF THE INVENTION

The present invention provides a printing system, a printing apparatus, and a printing method, which make it possible to properly select a printer driver without putting load on the user, and generate print data using the selected printer driver even when an operating apparatus cannot communicate directly with an information processing apparatus having a print data-generating function.

In a first aspect of the present invention, there is provided a printing system including a printing apparatus for performing print processing based on print data, and one of a plurality of information processing apparatuses for generating the print data based on image data input thereto, and transmitting the print data to the printing apparatus, wherein the printing apparatus comprises a storage unit configured to store identification information for identifying a plurality of printer drivers that operate in the plurality of information processing apparatuses and are capable of transmitting print data generated thereby to the printing apparatus, an identification information-transmitting unit configured to be operable when an operating apparatus that can communicate with the printing apparatus requests the printing apparatus to transmit the identification information, to transmit the identification information to the operating apparatus, so as to cause the operating apparatus to select one of the plurality of printer drivers, a selection information-receiving unit configured to receive selection information indicative of the printer driver selected by the operating apparatus in response to transmission of the identification information to the operating apparatus by the identification information-transmitting unit, and the image data, from the operating apparatus, a selection unit configured to select the printer driver for generating the print data based on the selection information received by the selection information-receiving unit, a transfer unit configured to transfer the image data received from the operating apparatus, to one of the plurality of information processing apparatuses provided with the printer driver selected by the selection unit, a print data-receiving unit configured to receive from one of the plurality of information processing apparatuses provided with the printer driver selected by the selection unit, print data generated by the information processing apparatus, and a printing unit configured to execute print processing based on the print data received by the print data-receiving unit, and wherein one of the plurality of information processing apparatuses provided with the printer driver selected by the selection unit comprises a generation unit configured to generate print data based on the image data transferred by the transfer unit by causing the printer driver selected by the selection unit to operate, and a print data-transmitting unit configured to transmit the print data generated by the generation unit to the printing apparatus.

In a second aspect of the present invention, there is provided a printing apparatus that receives, from one of a plurality of information processing apparatuses for generating print data based on image data input thereto, the print data, and performs print processing based on the print data, comprising a storage unit configured to store identification information for identifying a plurality of printer drivers that operate in the plurality of information processing apparatuses and are capable of transmitting print data generated thereby to the printing apparatus, an identification information-transmitting unit configured to be operable when an operating apparatus that can communicate with the printing apparatus requests the printing apparatus to transmit the identification information, to transmit the identification information to the operating apparatus, so as to cause the operating apparatus to select one of the plurality of printer drivers, a selection information-receiving unit configured to receive selection information indicative of the printer driver selected by the operating apparatus in response to transmission of the identification information to the operating apparatus by the identification information-transmitting unit, and the image data, from the operating apparatus, a selection unit configured to select the printer driver for generating the print data based on the selection information received by the selection information-receiving unit, a transfer unit configured to transfer the image data received from the operating apparatus, to one of the plurality of information processing apparatuses provided with the printer driver selected by the selection unit, a print data-receiving unit configured to receive from one of the plurality of information processing apparatuses provided with the printer driver selected by the selection unit, print data generated by the information processing apparatus, and a printing unit configured to execute print processing based on the print data received by the print data-receiving unit.

In a third aspect of the present invention, there is provided a printing method in a printing system including a printing apparatus for performing print processing based on print data, and one of a information processing apparatuses for generating the print data based on image data input thereto, and transmitting the print data to the printing apparatus, comprising the printing apparatus transmitting, when an operating apparatus that can communicate with the printing apparatus requests the printing apparatus to transmit identification information for identifying a printer driver that is capable of transmitting print data generated thereby to the printing apparatus, the identification information to the operating apparatus so as to cause the operating apparatus to select one of the plurality of printer drivers for generating the print data, the printing apparatus receiving selection information indicative of the printer driver selected by the operating apparatus in response to transmission of the identification information to the operating apparatus by the transmitting of the identification information, and the image data, from the operating apparatus, the printing apparatus selecting the printer driver for generating the print data based on the selection information received by the receiving of the selection information, the printing apparatus transferring the image data received from the operating apparatus, to one of the plurality of information processing apparatuses provided with the printer driver selected by the selecting, the printing apparatus receiving from one of the plurality of information processing apparatuses provided with the printer driver selected by the selecting, print data generated by the information processing apparatus, and the printing apparatus executing print processing based on the print data received by the receiving of print data.

According to the present invention, even when the operating apparatus cannot communicate directly with the information processing apparatus having the print data-generating function, it is possible to properly select a printer driver without putting load on the user, and generate print data using the selected printer driver.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
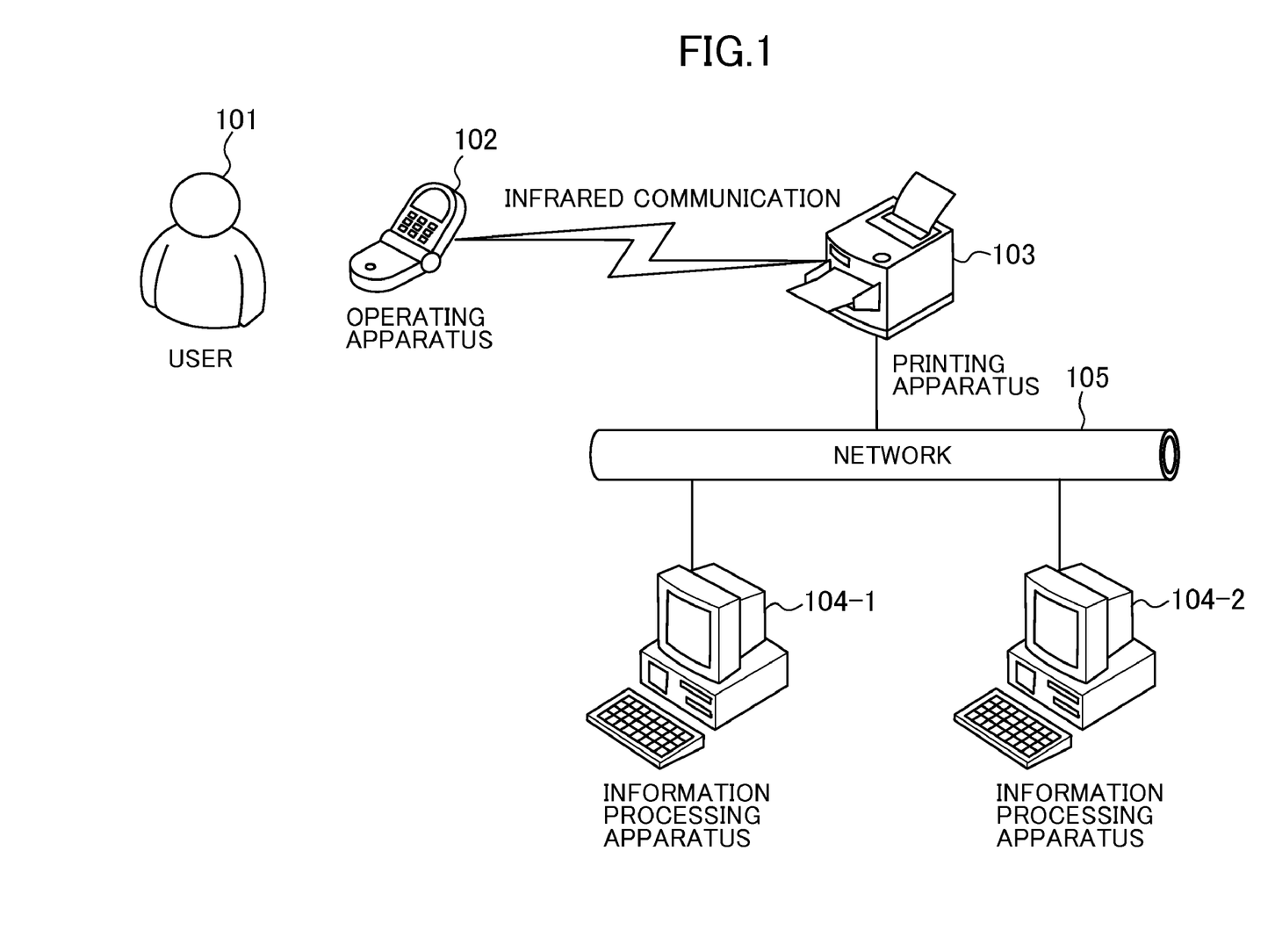
FIG. 1 is a conceptual view of a printing system according to an embodiment of the present invention.

FIG. 1 is a conceptual view of a printing system according to an embodiment of the present invention.

As shown in FIG. 1, the printing system is comprised of an operating apparatus (portable terminal) 102 operated (used) by a user 101, a printing apparatus 103 that sends and receives information between the operating apparatus 102 by infrared communication, and information processing apparatuses 104 connected to the printing apparatus 103 via a network 105. In the illustrated example, the number of information processing apparatuses connected to the printing apparatus 103 is two (104-1 and 104-2).

Figure 2:
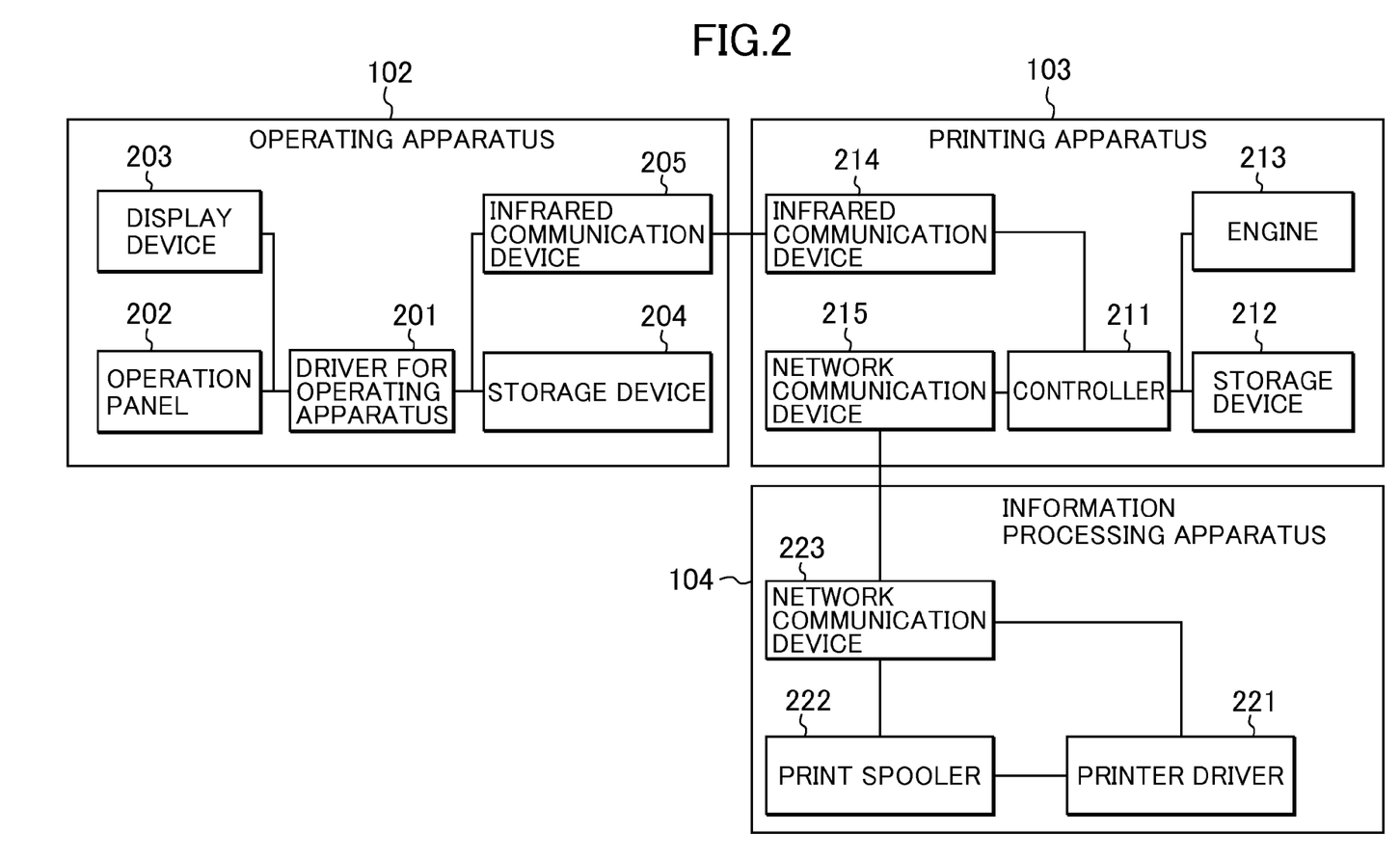
FIG. 2 is a block diagram of the printing system shown in FIG. 1.

FIG. 2 is a block diagram of the printing system appearing in FIG. 1.

As shown in FIG. 2, the operating apparatus 102 includes the following units:

A driver 201 for the operating apparatus 102 is used when the operating apparatus 102 transfers image data stored in a storage device 204 thereof to the information processing apparatus 104 via the printing apparatus 103. The operating apparatus 102 does not have the function (print data-generating function) of generating print data that can be used in print processing by the printing apparatus 103, from the image data stored in the storage device 204. To solve this problem, the operating apparatus 102 transfers image data stored in the storage device 204 to the information processing apparatus 104 via the printing apparatus 103. Further, the driver 201 for the operating apparatus 102 also serves as an authentication information-storing unit that stores authentication information of its own.

The operating apparatus 102 includes an operation panel 202 via which the user of the operating apparatus 102 inputs an instruction thereto so as to operate the operating apparatus 102. Further, the operating apparatus 102 includes a display device 203 via which information is notified to the user. The storage device 204 is used for storing image data and the like. Further, the operating apparatus 102 includes an infrared communication device (communication unit) 205 which is used to communicate with the printing apparatus 103 for transmission and reception of image data and other information.

The printing apparatus 103 includes the following units:

A controller 211 controls communication with the operating apparatus 102 via an infrared communication device 214, and communication with the information processing apparatus 104 via a network communication device 215. Further, the controller 211 controls input and output of data to and from a storage device 212, and print processing executed based on print data by an engine 213.

The storage device 212 stores print data received from the information processing apparatus 104 via the network communication device 215. The controller 211 sequentially reads out the print data from the storage device 212 and transfers the same to the engine 213.

The engine 213 performs print processing on sheets based on the print data sent from the storage device 212 by the controller 211. It should be noted that the engine 213 notifies the controller 211 of a state thereof (a state free from abnormality, an abnormal state due to a paper jam, a state in which the remaining number of sheets is small, or the like).

The infrared communication device 214 communicates with the operating apparatus 102. The network communication device 215 communicates with a network communication device 223 of the information processing apparatus 104.

The information processing apparatus 104 includes the network communication device 223, a printer driver 221, and a print spooler 222.

The printer driver 221 generates print data based on image data input thereto. Further, the printer driver 221 always monitors the state of the printing apparatus 103.

The print spooler 222 temporarily stores the print data generated by the printer driver 221. The network communication device 223 performs a process for communication with the printing apparatus 103, including a process for transmitting the print data stored in the print spooler 222 to the printing apparatus 103.

It should be noted that in the example illustrated in FIG. 2, only one printer driver 221 is provided in the information processing apparatus 104, a plurality of printer drivers may be provided therein. For example, when a network interface and a USB interface are provided as interfaces for connection between the information processing apparatus 104 and the printing apparatus 103, it is possible to provide printer drivers associated with the respective interfaces.

Further, for the same interface, there may be provided a plurality of printer drivers between which configuration information for generating print data is varied. As described above, it is not essential that the information processing apparatus 104 and the printer driver exist in a one-to-one relation, but a configuration is also possible in which one information processing apparatus is provided with a plurality of printer drivers.

Further, the respective printer drivers can generate print data, independently of each other, for causing the printing apparatus 103 to execute print processing, and hence in the present embodiment, each printer driver is referred to as a logical printer.

Figure 3:
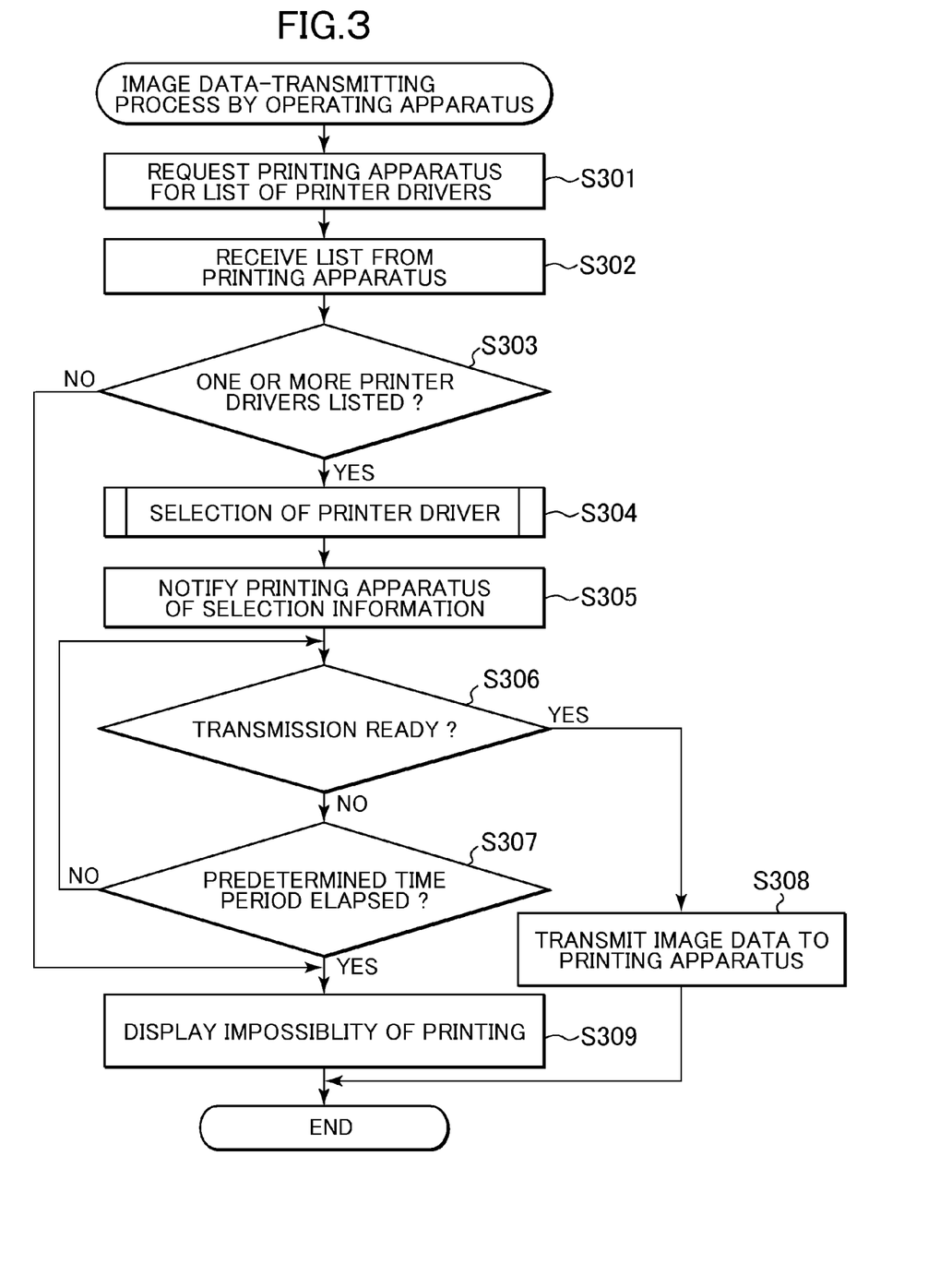
FIG. 3 is a flowchart of an image data-transmitting process executed by an operating apparatus appearing in FIG. 2.

FIG. 3 is a flowchart of an image data-transmitting process executed by the operating apparatus 102 appearing in FIG. 2. It should be noted that each step shown in FIG. 3 is executed by a CPU (not shown) of the operating apparatus 102 causing the driver 201 to operate.

More specifically, FIG. 3 shows a flow of processing executed by the operating apparatus 102 when the operating apparatus 102 transmits image data stored therein to the printing apparatus 103.

The image data-transmitting process is started in a step S301, wherein the user (operator) of the operating apparatus 102 gives the operating apparatus 102 a print instruction for executing printing by the printing apparatus 103 that is performing infrared communication with the operating apparatus 102. The operating apparatus 102 requests the printing apparatus 103 to transmit a list of information processing apparatuses 104 that are capable of transmitting print data to the printing apparatus 103 (the list including authentication information for using the information processing apparatuses 104).

Figure 9:
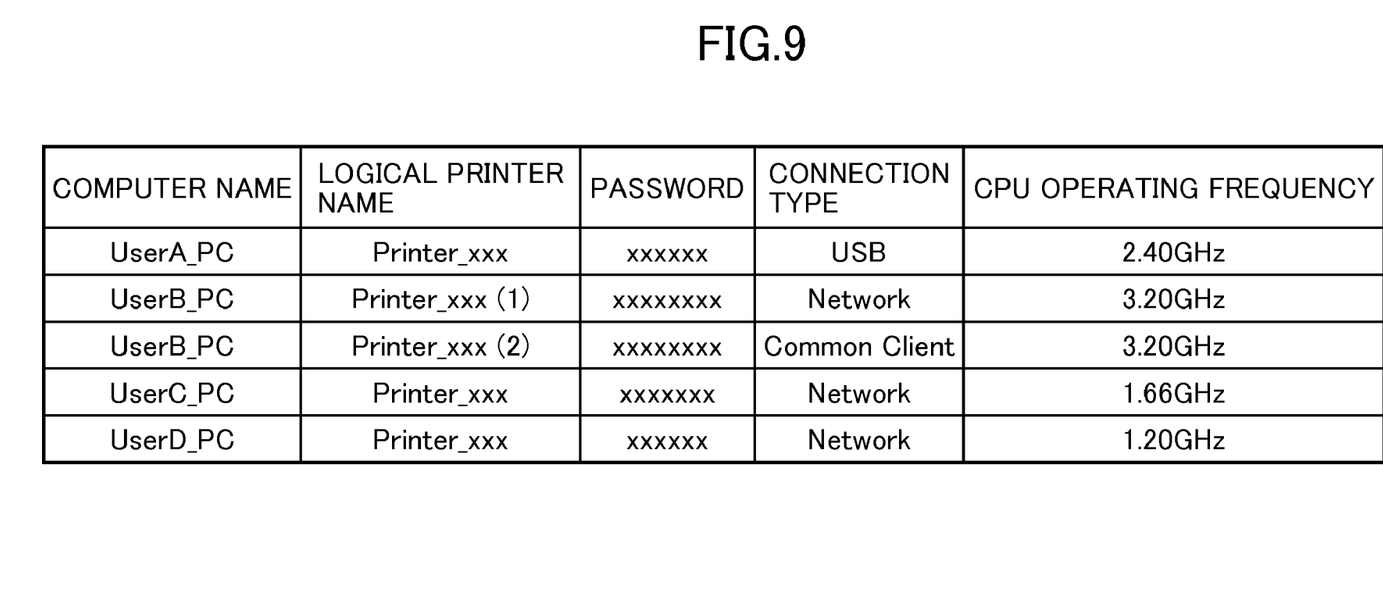
FIG. 9 is a table showing an example of the list obtained in response to a list information request in a step S502 in FIG. 5.

In a step S302, the infrared communication device 205 of the operating apparatus 102 receives the information of a list of printer drivers that are capable of transmitting print data to the printing apparatus 103, which is transmitted from the infrared communication device 214 of the printing apparatus 103. FIG. 9 shows an example of the list of printer drivers (logical printers) that are capable of transmitting print data to the printing apparatus 103, which list is received by the operating apparatus 102 from the printing apparatus 103.

In a step S303, it is determined whether or not the received list contains at least one information item of the information processing apparatuses 104. If the received list contains at least one more information item of the information processing apparatuses 104, the driver 201 for the operating apparatus causes the process to proceed to a step S304, whereas if the received list contains no information item of the information processing apparatuses 104, the process proceeds to a step S309.

In the step S304, the driver 201 for the operating apparatus 102 selects a printer driver (logical printer) from the list.

In a step S305, the operating apparatus 102 notifies the printing apparatus 103 of selection information indicative of the printer driver selected in the step S304.

In a step S306, it is determined whether or not a transmission-ready flag, which indicates whether or not the operating apparatus 102 is ready for transmitting the image data to the printing apparatus 103 is on. If the transmission-ready flag is on, the process proceeds to a step S308, whereas if the transmission-ready flag is off, the process proceeds to a step S307.

In the step S307, it is determined whether or not a predetermined time period has elapsed after notification of the selection information to the printing apparatus 103. If the predetermined time period has elapsed, it is determined that the processing has failed for some reason, and the process proceeds to the step S309, whereas if the predetermined time period has not elapsed, the process returns to the step S306.

In the step S308, the operating apparatus 102 transmits the image data stored in the storage device 204 to the printing apparatus 103, followed by terminating the present process. It should be noted that data transmitted to the printing apparatus 103 is transferred to the information processing apparatus 104 provided with the selected printer driver, as referred to hereinafter in a step S707 in FIG. 7 and a step S806 in FIG. 8.

In the step S309, since no information processing apparatus 104 is connected to the printing apparatus 103, the operating apparatus 102 displays a message to the effect that it is impossible to perform printing, on the display device 203, followed by terminating the present process.

Figure 4:
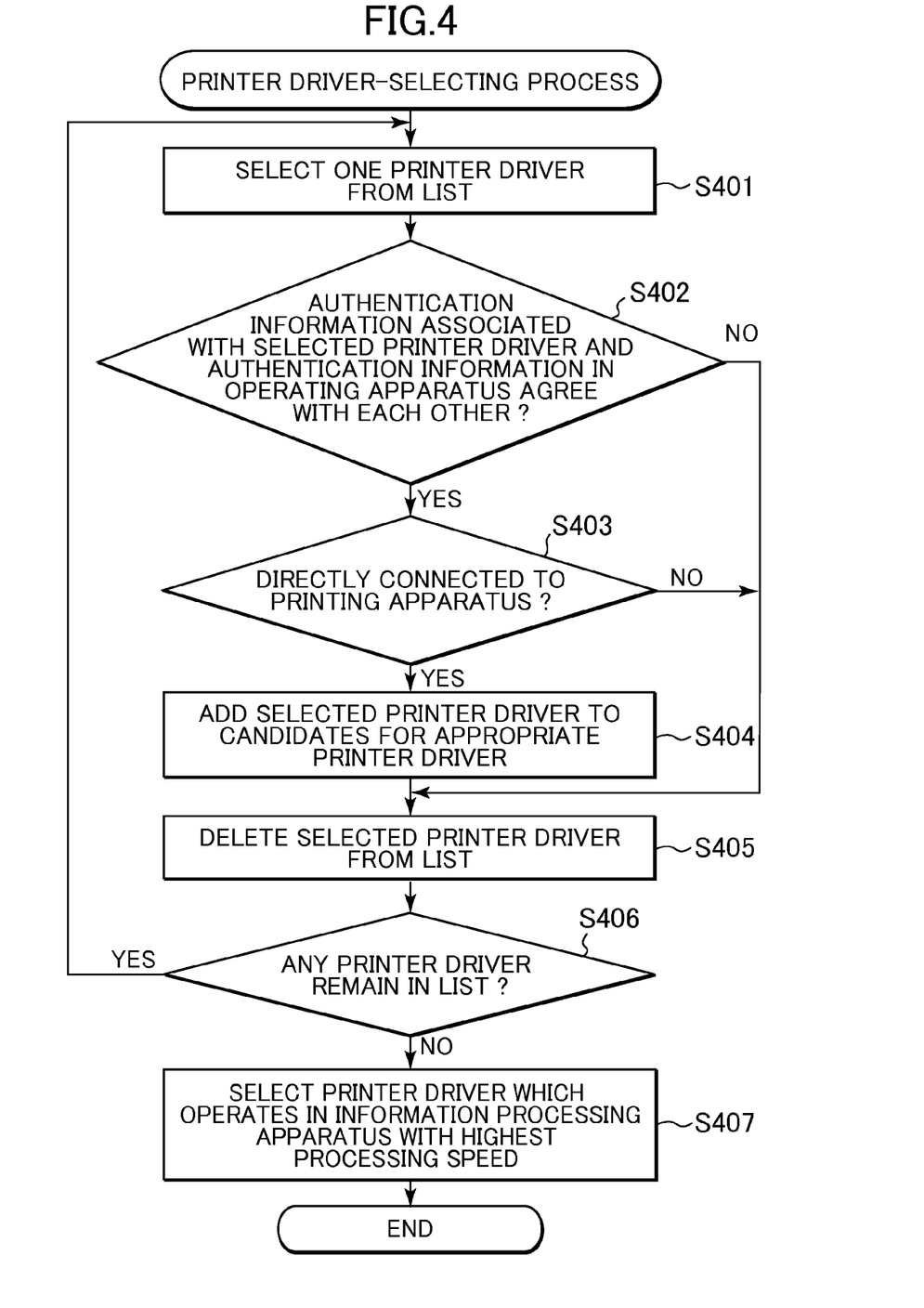
FIG. 4 is a flowchart of a printer driver-selecting process executed in a step S304 in FIG. 3.

FIG. 4 is a flowchart of a printer driver-selecting process executed in the step S304 in FIG. 3.

The present process is started in a step S401. In the step S401, a printer driver (logical printer) is selected from the list (printer driver identification information) received from the printing apparatus 103, and the process proceeds to a step S402.

In the step S402, it is determined whether or not the authentication information item (first authentication information) stored in the operating apparatus 102, and one of authentication information items (second authentication information) of the respective printer drivers stored in the storage device 212 of the printing apparatus 103, the one being associated with the printer driver selected in the step S401, agree with each other. Here, the authentication information items correspond to "passwords" in FIG. 9, for example.

It should be noted that the present process plays the role of preventing the user from printing the image data by a printer driver (logical printer) which the user is not authorized to use. If the authentication information items agree with each other, the process proceeds to a step S403, whereas if the authentication information items do not agree with each other, the process proceeds to a step S405.

In the step S403, it is determined whether or not the printing apparatus 103 and the information processing apparatuses 104 are directly connected to each other. In the example illustrated in FIG. 9, if the printing apparatus 103 and the information processing apparatus 104 are connected by USB or network, it is determined that they are directly connected to each other, whereas if the printing apparatus 103 is a shared client for the information processing apparatus 104, it is determined that they are indirectly connected to each other.

If the printing apparatus 103 and the information processing apparatus 104 are directly connected to each other, the process proceeds to a step S404, whereas if they are indirectly connected to each other, the process proceeds to the step S405.

In the step S404, the driver 201 for the operating apparatus 102 adds the printer driver selected in the step S401 to a list of candidates for an appropriate printer driver, and the process proceeds to the step S405.

In the step S405, the driver 201 deletes the information processing apparatus 104 selected in the step S401, and the process proceeds to a step S406.

In the step S406, it is checked whether or not any printer driver remains in the list. If any printer driver remains in the list, the process returns to the step S401, whereas if no printer driver remains in the list, the process proceeds to a step S407.

In the step S407, the driver 201 selects a printer driver stored in an information processing apparatus 104 of which the processing speed is highest of all the information processing apparatuses 104 storing the respective printer driver candidates, followed by terminating the present process. It should be noted that the processing speed corresponds e.g. to "CPU operating frequency" appearing in FIG. 9.

Figure 5:
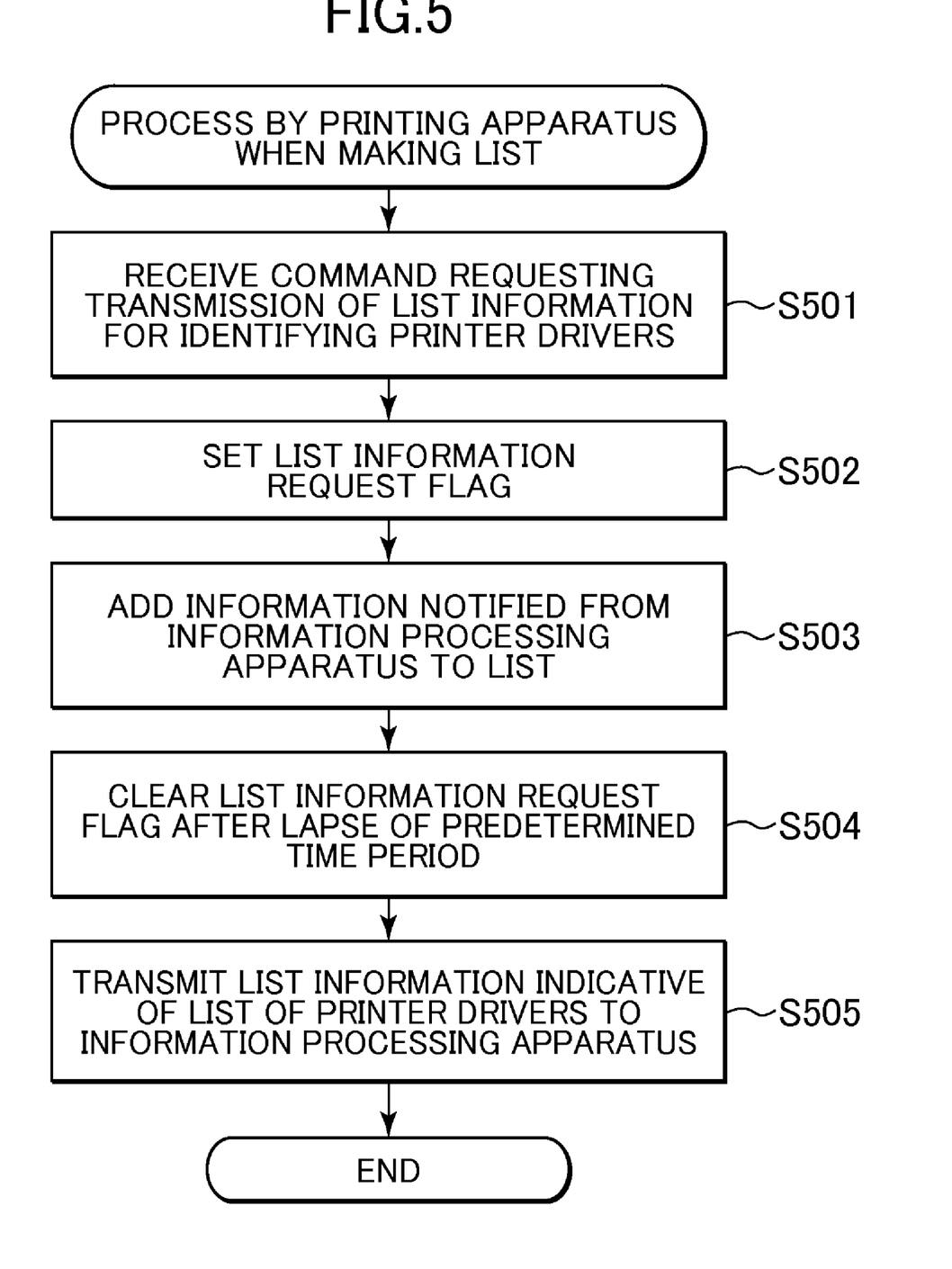
FIG. 5 is a flowchart of a process executed by a printing apparatus when a list of information processing apparatuses appearing in FIG. 2 is made.

FIG. 5 is a flowchart of a process executed by the printing apparatus when a list of information processing apparatuses appearing in FIG. 2 is made. It should be noted that each step in FIG. 5 is executed by the controller 211 of the printing apparatus 103 based on a control program stored in the storage device 212.

The present process is started in a step S501. It should be noted that the present process is carried out by the printing apparatus 103 between the steps S301 and S302 in FIG. 3.

In the step S501, from the operating apparatus 102 that can communicate with the printing apparatus 103, the controller 211 receives a command which requests transmission of list information for identifying printer drivers that can transmit print data generated thereby to the printing apparatus 103.

In a step S502, the controller 211 sets a list information request flag in response to the reception of the command from the operating apparatus 102 in the step S501, thereby requesting each information processing apparatus 104 connected to the printing apparatus 103 to notify the controller 211 of the current operating state of the information processing apparatus 104.

In a step S503, the controller 211 prepares a form of a list of printer drivers, and sequentially adds information notified from each information processing apparatus 104 to the form to thereby make the list.

In a step S504, the controller 211 clears the list information request flag when a predetermined time period has elapsed after setting the flag.

In a step S505, the controller 211 transmits list information indicative of the list of the printer drivers to the operating apparatus 102, followed by terminating the present process.

Figure 6:
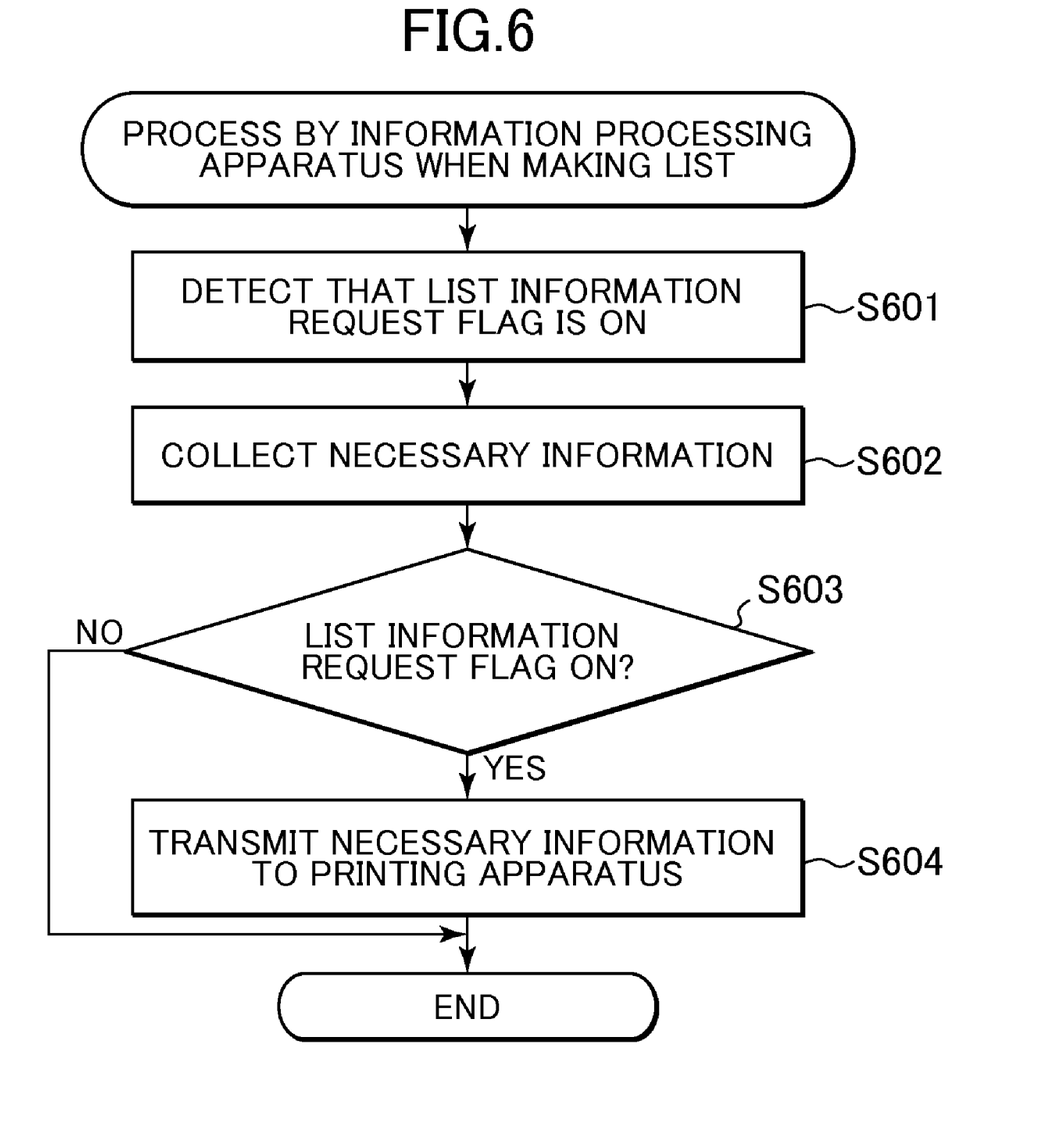
FIG. 6 is a flowchart of a process executed by an information processing apparatus when the list of information processing apparatuses appearing in FIG. 2 is made.

FIG. 6 is a flowchart of a process executed by the information processing apparatus 104 when the list of printer drivers is made. It should be noted that each step in FIG. 6 is executed by a CPU (not shown) of the information processing apparatus 104 based on a control program stored in a memory (not shown) included in the information processing apparatus 104.

The present process is started in a step S601. It should be noted that the present process is carried out between the steps S301 and S302 in FIG. 3 by the information processing apparatus 104.

In the step S601, the information processing apparatus 104 detects that the list information request flag has been set by the printing apparatus 103. It should be noted that as mentioned hereinabove, the printer driver 221 provided in the information processing apparatus 104 always monitors the state of the printing apparatus 103, and hence the printer driver 221 can detect the flag.

In a step S602, the information processing apparatus 104 collects necessary information from the printing apparatus 103. The necessary information includes, for example, the items of the list shown in FIG. 9. These items will be described in detail hereinafter.

Further, if the information processing apparatus 104 has a plurality of printer drivers (logical printers), the information processing apparatus 104 collects necessary information on the respective printer drivers. In the above-described step S304, if a plurality of logical printers that are connected to the printing apparatus 103 exist in the information processing apparatus 104, the necessary information is collected from each of the logical printers. After the information processing apparatus 104 has collected the information, the process proceeds to a step S603.

In the step S603, the information processing apparatus 104 checks whether or not the list information request flag remains on. If the list information request flag is on, the process proceeds to a step S604, whereas if the list information request flag is not on, the information processing apparatus 104 abandons the collected information, followed by terminating the present process.

In the step S604, the information processing apparatus 104 transmits the collected information, i.e. the list to the printing apparatus 103, followed by terminating the present process.

Figure 7:
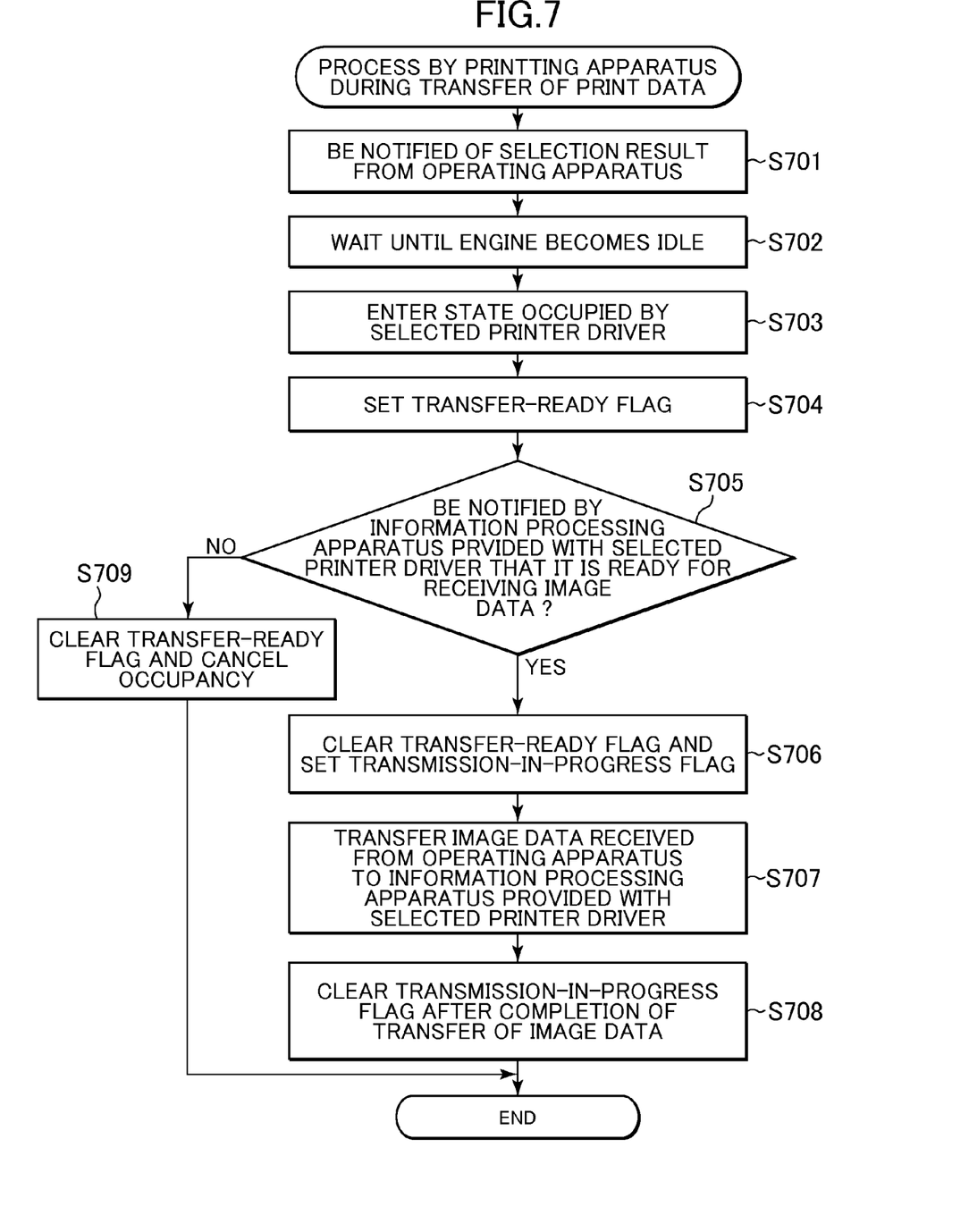
FIG. 7 is a flowchart of a process executed by the printing apparatus appearing in FIG. 2 during transfer of print data.

FIG. 7 is a flowchart of a process executed by the printing apparatus 103 appearing in FIG. 2 during transfer of the image data received from the operating apparatus to the information processing apparatus. It should be noted that each step in FIG. 7 is executed by the controller 211 of the printing apparatus 103 based on a control program stored in the storage device 212.

The present process is started in a step S701. It should be noted that the present process is carried out in parallel with the steps S305 et seq. in FIG. 3.

In the step S701, the printer driver selected in the step S304 is notified from the operating apparatus 102 to the printing apparatus 103. The step S701 corresponds to the step S305 in FIG. 3. In response to this notification, the controller 211 selects a printer driver for generating print data from the image data received from the operating apparatus 102.

In a step S702, the controller 211 waits until the engine 213 of the printing apparatus 103 enters an idling state permitting the engine 213 to execute printing. At this time, it is assumed that new print data and an occupancy request are inhibited from being received. When the engine 213 enters the idling state, the process proceeds to a step S703.

In the step S703, the controller 211 enters a state occupied by the printer driver notified in the step S701.

In a step S704, the controller 211 sets a transfer-ready flag, which indicates that the printing apparatus 102 is ready for transferring the image data received from the operating apparatus 102 to the information processing apparatus 104.

In a step S705, the controller 211 checks whether or not a notification is received from the information processing apparatus 104 provided with the printer driver selected in the step S701, the notification saying that the information processing apparatus 104 is ready for receiving the image data, before the lapse of a predetermined time period after setting the transfer-ready flag. If the notification has been received, the process proceeds to a step S706, whereas if the notification has not been received, the process proceeds to a step S709.

In the step S706, the controller 211 clears the transfer-ready flag, and sets a transmission-in-progress flag.

In the step S707, the controller 211 transfers image data transmitted from the operating apparatus 102, to the information processing apparatus 104 provided with the printer driver notified and selected in the step S701. The step S707 corresponds to the step S308 in FIG. 3, and a step S806 in FIG. 8.

In a step S708, upon completion of the transfer of the image data, the controller 211 clears the transmission-in-progress flag, followed by terminating the present process.

Figure 8:
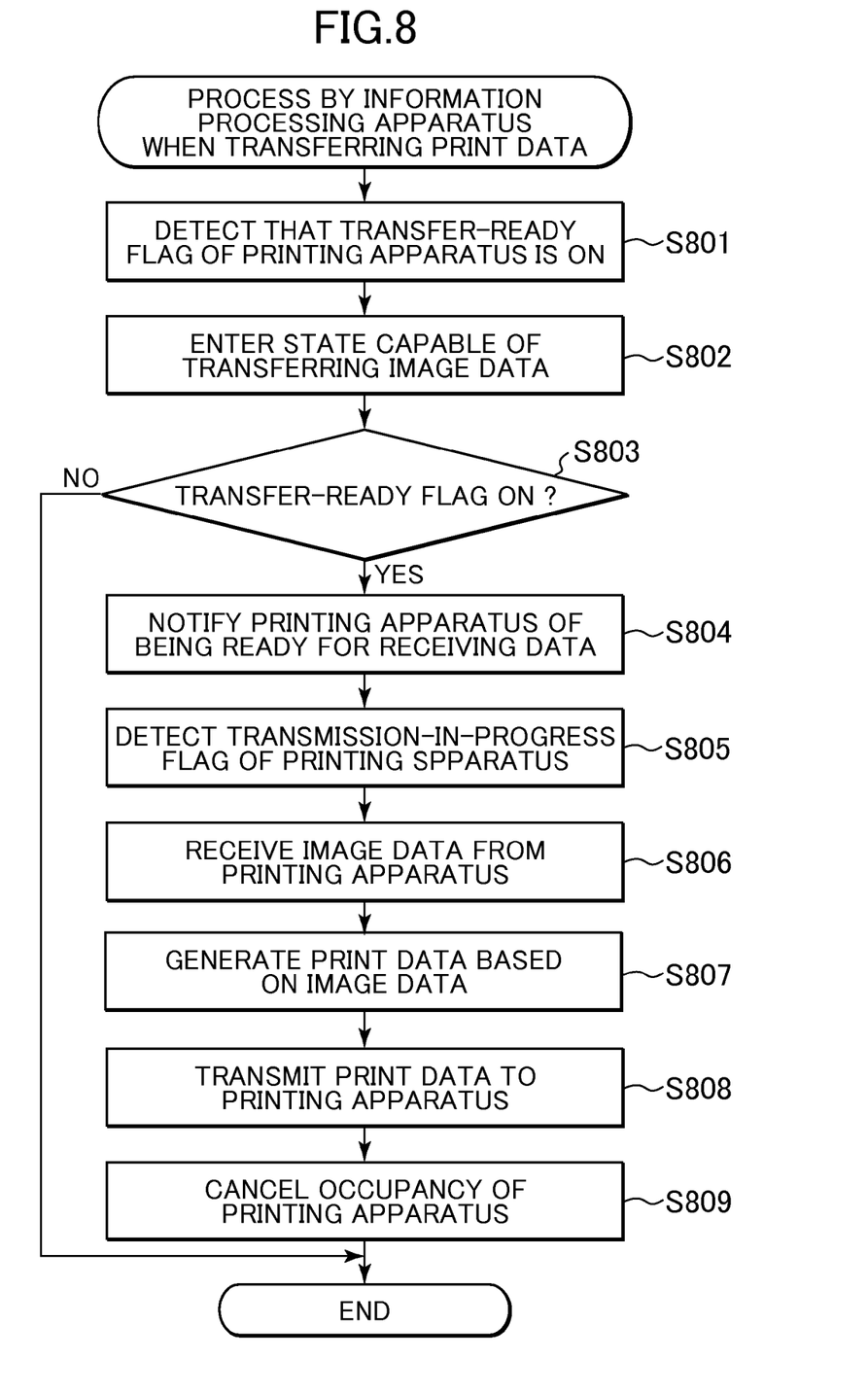
FIG. 8 is a flowchart of a process executed by the information processing apparatus appearing in FIG. 2, when the information processing apparatus transfers print data.

FIG. 8 is a flowchart of a process executed by the information processing apparatus in FIG. 2, when the information processing apparatus transfers print data.

The present process is started in a step S801. It should be noted that the present process is carried out in parallel with the steps S704 et seq. in FIG. 7.

In the step S801, the information processing apparatus 104 detects that the transfer-ready flag of the printing apparatus 103 is on.

In a step S802, the information processing apparatus 104 enters a state capable of transferring the image data. If printing is in progress, the information processing apparatus 104 awaits termination of a print job currently being executed while keeping the following jobs on standby. Then, when the information processing apparatus 104 enters the state capable of transferring the image data, the process proceeds to a step S803.

In the step S803, the information processing apparatus 104 checks whether or not the transfer-ready flag is on. If the transfer-ready flag is on, the process proceeds to a step S804, whereas if the transfer-ready flag is off, the present process is terminated.

In the step S804, the information processing apparatus 104 notifies the printing apparatus 103 that the information processing apparatus 104 is ready for receiving the image data transferred from the printing apparatus 103.

In a step S805, the information processing apparatus 104 detects that the printing apparatus 103 has set the transmission-in-progress flag.

In the step S806, the information processing apparatus 104 receives the image data from the printing apparatus 103. The step S806 corresponds to the step S308 in FIG. 3, and the step S707 in FIG. 7.

In a step S807, the information processing apparatus 104 passes the image data to the printer driver 221 to generate print data based on the image data.

In a step S808, the information processing apparatus 104 transmits the print data generated by the printer driver 221 based on the image data received from the printing apparatus 103, to the printing apparatus 103 via the print spooler 222.

In a step S809, the information processing apparatus 104 cancels the occupancy of the printing apparatus 103 after completion of transmission of the print data, followed by terminating the present process.

FIG. 9 is a table showing an example of the list obtained in response to the list information request in the step S502 in FIG. 5.

A computer name represents the name of an information processing apparatus 104. A logical printer name represents the name of a logical printer (printer driver) which the information processing apparatuses 104 has and is connected to the printing apparatus 103. A password represents authentication information which the information processing apparatus 104 has.

In the present embodiment, as described in the step S402, unless a password that the operating apparatus 102 has and a password that an information processing apparatus 104 has agree with each other, such an information processing apparatus 104 is not selected as a candidate of the appropriate information processing apparatus, and hence is prevented from being selected as an appropriate information processing apparatus.

A connection type represents a type of connection between the information processing apparatuses 104 and the printing apparatus 103, such as USB or network.

A CPU represents the CPU of an information processing apparatus 104. As can be seen from the step S407, in the present embodiment, the operating frequency of the CPU is handled as the processing speed thereof.

As described above, it is possible to realize a printing system in which the operating apparatus 102 transfers data to an information processing apparatus 104 via the printing apparatus 103, and when there are a plurality of information processing apparatuses 104 that are connected to the printing apparatus 103, an appropriate one is automatically selected from the information processing apparatuses 104.

In the present embodiment, the printing apparatus 103 has the list information request flag (step S502 in FIG. 5). The information processing apparatus 104 always monitors the printing apparatus 103, detects that the printing apparatus 103 has set the list information request flag, and transmits the current operating state thereof to the printing apparatus 103.

However, there can be another case in which the printing apparatus 103, which has no list information request flag, communicates with the information processing apparatus 104 to request the same to transmit the current operating state thereof.

Further, although in the present embodiment, the printing apparatus 103 has the function of making a list of the information processing apparatuses 104 connected to the printing apparatus 103, this is not limitative, but the operating apparatus 102 can be configured to have the function of making the list.

In this case, the printing apparatus 103 transmits the received information concerning the information processing apparatuses 104 to the operating apparatus 102, and the printing apparatus 103 makes the list.

Further, although in the present embodiment, the operating apparatus 102 has the function of selecting an information processing apparatus 104, this is not limitative, but the present invention can also be applied to a case in which the printing apparatus 103 has the function of selecting an information processing apparatus 104.

In this case, the printing apparatus 103 automatically selects an appropriate information processing apparatus 104 by itself without notifying the operating apparatus 102 of a list of the information processing apparatuses 104.

Furthermore, the printing apparatus 103 enters a state occupied by the appropriate information processing apparatus 104 without being notified of the appropriate information processing apparatus from the operating apparatus 102. Then, the operating apparatus 102, which has detected the fact, transfers image data from which an image is to be formed to the printing apparatus 103.

Further, although in the present embodiment, an appropriate information processing apparatus 104 is automatically selected as shown in FIG. 4, it is possible for the user to manually select an appropriate information processing apparatus 104.

Figure 10:
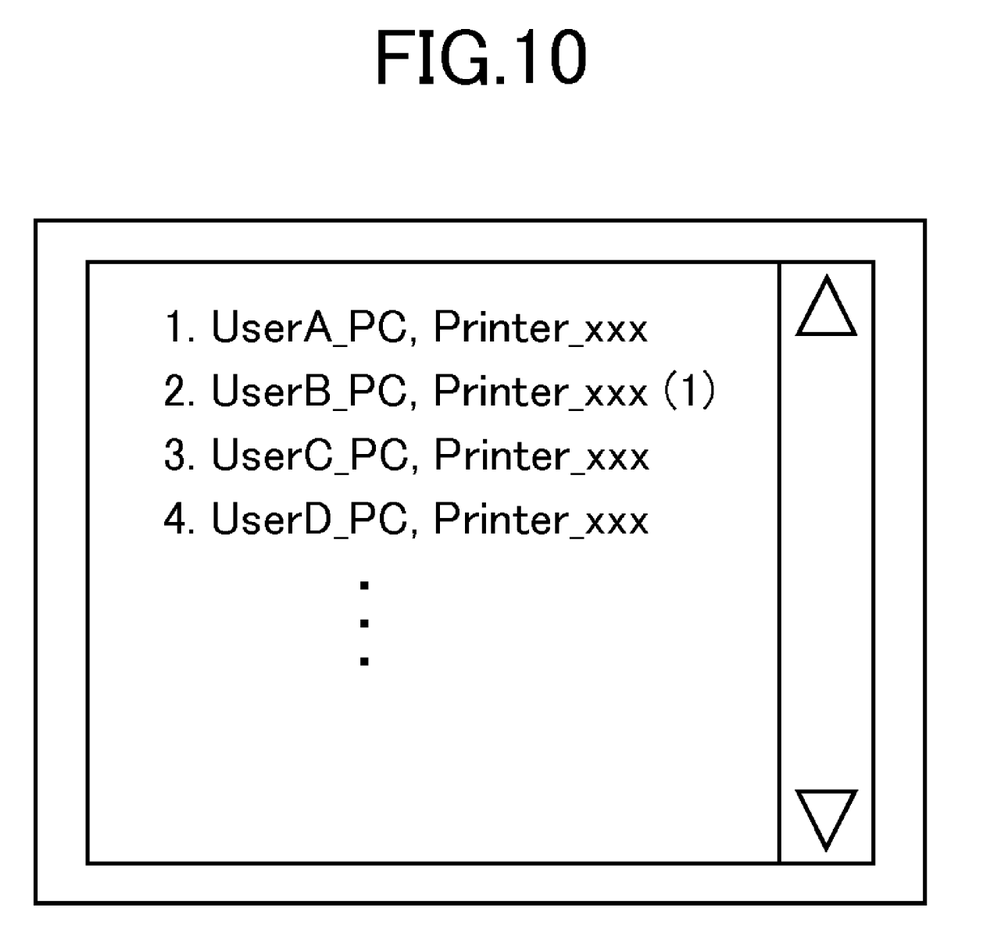
FIG. 10 is a view showing an example of a screen displayed when the user manually selects an appropriate information processing apparatus.

FIG. 10 is a view showing an example of a screen displayed when the user manually selects an appropriate information processing apparatus.

As shown in FIG. 10, candidates for the appropriate information processing apparatus 104 are selected with the same algorithm as used in the FIG. 4 flowchart, and are displayed on the display device 203 in the order of processing speed.

In the present invention, the printing apparatus includes an identification information-transmitting unit, a selection information-receiving unit, and a print data-receiving unit. Further, the information processing apparatus includes a print data-transmitting unit, and the operating apparatus includes an authentication information-receiving unit, an identification information-receiving unit, and a selection information-transmitting unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-327365 filed Dec. 19, 2007, which is hereby incorporated by reference herein in its entirety.

What is claimed is:

1. A printing system including a printing apparatus for performing print processing based on print data, and one of a plurality of information processing apparatuses for generating the print data based on image data input thereto, and transmitting the print data to said printing apparatus, wherein said printing apparatus comprises:

a storage unit configured to store identification information for identifying a plurality of printer drivers that operate in said plurality of information processing apparatuses and are capable of transmitting print data generated thereby to said printing apparatus;

an identification information-transmitting unit configured to be operable when an operating apparatus that can communicate with said printing apparatus requests said printing apparatus to transmit the identification information, to transmit the identification information to said operating apparatus, so as to cause said operating apparatus to select one of the plurality of printer drivers;

a selection information-receiving unit configured to receive selection information indicative of the printer driver selected by said operating apparatus in response to transmission of the identification information to said operating apparatus by said identification information-transmitting unit, and the image data, from said operating apparatus;

a selection unit configured to select the printer driver for generating the print data based on the selection information received by said selection information-receiving unit;

a transfer unit configured to transfer the image data received from said operating apparatus, to one of said plurality of information processing apparatuses provided with the printer driver selected by said selection unit;

a print data-receiving unit configured to receive from one of said plurality of information processing apparatuses provided with the printer driver selected by said selection unit, print data generated by said information processing apparatus; and a printing unit configured to execute print processing based on the print data received by said print data-receiving unit, and wherein one of said plurality of information processing apparatuses provided with the printer driver selected by said selection unit comprises:

a generation unit configured to generate print data based on the image data transferred by said transfer unit by causing the printer driver selected by said selection unit to operate; and a print data-transmitting unit configured to transmit the print data generated by said generation unit to said printing apparatus.

2. The printing system according to claim 1, wherein said printing system includes said operating apparatus, and wherein said operating apparatus comprises:

an authentication information-storing unit configured to store first authentication information for causing the printer driver to generate print data;

an authentication information-receiving unit configured to receive second authentication information for causing a printer driver that operates in one of said plurality of information processing apparatuses connected to said printing apparatus to generate print data, from said printing apparatus;

an identification information-receiving unit configured to receive the identification information transmitted by said identification information-transmitting unit;

a display unit configured to display a list of printer drivers associated with the second authentication information, based on the identification information received by said identification information-receiving unit, when the first authentication information and the second authentication information agree with each other; and a selection information-transmitting unit configured to transmit selection information indicative of the printer driver selected by an operator of said operating apparatus via said display unit, to said printing apparatus.

3. A printing apparatus that receives, from one of a plurality of information processing apparatuses for generating print data based on image data input thereto, the print data, and performs print processing based on the print data, comprising:

a storage unit configured to store identification information for identifying a plurality of printer drivers that operate in said plurality of information processing apparatuses and are capable of transmitting print data generated thereby to said printing apparatus;

an identification information-transmitting unit configured to be operable when an operating apparatus that can communicate with said printing apparatus requests said printing apparatus to transmit the identification information, to transmit the identification information to said operating apparatus, so as to cause said operating apparatus to select one of the plurality of printer drivers;

a selection information-receiving unit configured to receive selection information indicative of the printer driver selected by said operating apparatus in response to transmission of the identification information to said operating apparatus by said identification information-transmitting unit, and the image data, from said operating apparatus;

a selection unit configured to select the printer driver for generating the print data based on the selection information received by said selection information-receiving unit;

a transfer unit configured to transfer the image data received from said operating apparatus, to one of said plurality of information processing apparatuses provided with the printer driver selected by said selection unit;

a print data-receiving unit configured to receive from one of said plurality of information processing apparatuses provided with the printer driver selected by said selection unit, print data generated by said information processing apparatus; and a printing unit configured to execute print processing based on the print data received by said print data-receiving unit.

4. A printing method in a printing system including a printing apparatus for performing print processing based on print data, and one of plurality of information processing apparatuses for generating the print data based on image data input thereto, and transmitting the print data to the printing apparatus, comprising:

the printing apparatus transmitting, when an operating apparatus that can communicate with the printing apparatus requests the printing apparatus to transmit identification information for identifying a printer driver that is capable of transmitting print data generated thereby to the printing apparatus, the identification information to the operating apparatus so as to cause the operating apparatus to select one of the plurality of printer drivers for generating the print data;

the printing apparatus receiving selection information indicative of the printer driver selected by the operating apparatus in response to transmission of the identification information to the operating apparatus by said transmitting of the identification information, and the image data, from the operating apparatus;

the printing apparatus selecting the printer driver for generating the print data based on the selection information received by said receiving of the selection information;

the printing apparatus transferring the image data received from the operating apparatus, to one of the plurality of information processing apparatuses provided with the printer driver selected by said selecting;

the printing apparatus receiving from one of the plurality of information processing apparatuses provided with the printer driver selected by said selecting, print data generated by the information processing apparatus; and the printing apparatus executing print processing based on the print data received by said receiving of print data.

5. The printing method according to claim 4, wherein the one of the plurality of information processing apparatuses generates print data based on image data transmitted by said transfer, by causing the printer driver selected by said selecting, and wherein the one of the plurality of information processing apparatuses transmits the print data generated by said generating, to the printing apparatus.

6. The printing method according to claim 4, wherein the operating apparatus includes an authentication information-storing unit configured to store first authentication information for causing the printer driver to generate print data, the method further comprising:

the operating apparatus receiving second authentication information for causing a printer driver that operates in one of the plurality of information processing apparatuses connected to the printing apparatus to generate print data, from the printing apparatus;

the operating apparatus receiving the identification information transmitted by said transmitting of the identification information;

the operating apparatus displaying a list of printer drivers associated with the second authentication information, based on the identification information received by said receiving of the identification information, when the first authentication information and the second authentication information agree with each other; and the operating apparatus transmitting selection information indicative of the printer driver selected by an operator of the operating apparatus via said display, to the printing apparatus.

* * * * *